(12) United States Patent
Li et al.

(10) Patent No.: US 7,153,486 B2
(45) Date of Patent: Dec. 26, 2006

(54) WETPROOFED CATALYSTS FOR HYDROGEN ISOTOPE EXCHANGE

(75) Inventors: Jintong Li, Deep River (CA); Sam Suppiah, Deep River (CA); Keith Kutchcoskie, Petawawa (CA)

(73) Assignees: Atomic Energy of Canada Limited, Ontario (CA); Energie Atomique Du Canada Limitee, Ontario (CA)

( * ) Notice: Subject to any disclaimer, the term of this patent is extended or adjusted under 35 U.S.C. 154(b) by 0 days.

(21) Appl. No.: 10/950,504

(22) Filed: Sep. 28, 2004

(65) Prior Publication Data

US 2005/0181938 A1   Aug. 18, 2005

Related U.S. Application Data

(62) Division of application No. 10/455,365, filed on Jun. 6, 2003, now abandoned.

(51) Int. Cl.
*C01B 4/00* (2006.01)
*C01B 5/02* (2006.01)

(52) U.S. Cl. .................. 423/580.2; 423/647.7

(58) Field of Classification Search ............ 423/580.2, 423/647.7
See application file for complete search history.

(56) References Cited

U.S. PATENT DOCUMENTS

| | | | |
|---|---|---|---|
| 3,888,974 A * | 6/1975 | Stevens ............ 423/580.2 |
| 3,981,976 A | 9/1976 | Stevens |
| 3,992,512 A | 11/1976 | Petrow et al. |
| 4,025,560 A | 5/1977 | Rolston et al. |
| 4,044,193 A | 8/1977 | Petrow et al. |
| 4,073,748 A | 2/1978 | Brown et al. |
| 4,082,699 A | 4/1978 | Petrow et al. |
| 4,126,667 A | 11/1978 | Butler et al. |
| 4,143,123 A | 3/1979 | Butler et al. |
| 4,171,350 A * | 10/1979 | Sanders ............ 423/580.1 |
| 4,217,332 A | 8/1980 | Hindin et al. |
| 4,259,209 A * | 3/1981 | Nakane et al. ............ 502/159 |
| 4,374,116 A * | 2/1983 | Chuang et al. .......... 423/580.2 |
| 4,399,120 A | 8/1983 | Cheung |
| 4,409,129 A | 10/1983 | Takeuchi et al. |
| 4,444,737 A * | 4/1984 | Tsuchiya et al. ......... 423/580.2 |
| 4,471,014 A | 9/1984 | den Hartog et al. |
| 4,613,584 A | 9/1986 | Schneider et al. |
| 4,631,263 A * | 12/1986 | Mizumoto et al. .......... 502/159 |
| 4,636,485 A | 1/1987 | van der Smissen |
| 4,996,033 A | 2/1991 | Gardner-Chavis et al. |
| 5,435,985 A | 7/1995 | Pukkinen et al. |
| 5,759,944 A | 6/1998 | Buchanan et al. |
| 5,767,036 A | 6/1998 | Freund et al. |
| 5,876,867 A | 3/1999 | Itoh et al. |

(Continued)

FOREIGN PATENT DOCUMENTS

CA   1063587   10/1979

(Continued)

OTHER PUBLICATIONS

Petre Margineanu, et al. "The Promoting Action of Chromia for Nickel Catalysts" Journal of Catalysis, δ, 359-367 (1967), no month.

(Continued)

*Primary Examiner*—Wayne A. Langel
(74) *Attorney, Agent, or Firm*—Sughrue Mion, PLLC

(57) ABSTRACT

A method to catalyze hydrogen isotope exchange between water and hydrogen in which the water and hydrogen are contacted with a wetproofed catalyst, the catalyst having a hydrophobic porous matrix which has dispersed therein catalytically active platinum and at least one other metal which is chromium or titanium.

25 Claims, 1 Drawing Sheet

U.S. PATENT DOCUMENTS

| | | | |
|---|---|---|---|
| 5,939,220 | A | 8/1999 | Gunner et al. |
| 6,001,768 | A | 12/1999 | Buysch et al. |
| 6,127,061 | A | 10/2000 | Shun et al. |

FOREIGN PATENT DOCUMENTS

| | | |
|---|---|---|
| JP | 12792-1978 | 2/1978 |
| JP | 1982-11250 | 1/1982 |

OTHER PUBLICATIONS

Petre Margineanu, et al "Metal/Oxide Support Effects in the $H_2$-$H_2O$ Deuterium Exchange Reaction Catalyzed by Nickel" Journal of Catalysis, 95, 1-12 (1985), no month.

Petre Marginean "Catalytic Activity of Ni-$Cr_2O_2$ in the $H_2$-$NH_2$ and H2-$H_2O$ Deuterium Exchange Reactions" Isotopenpraxis 22 (1986 12) 435-438, no month.

K. Bhattacharya, et al. "Isotopic Exchange between Hydrogen and Water over plain and hydrophobized nickel-chromia catalysts" Journal of Catalysis 134, 399-408 (1992), no month.

Norman H. Sagert "Hydrogen-Water Deuterium Exchange over metal oxide promoted nickel catalysts" Canadian Journal of Chemistry, V. 53 (21), pp. 3257-3262 (1975), no month.

Farid H. Abou El-Nour, et al. "Surface studies on catalysts used for deuterium exchange between hydrogen and water vapour" J. Applied Chemistry—Chemistry and Biotechnology UK (Oct. 1975), v. 25, p. 753-760.

F. Abou El-Nour, et al. "Nickel/Chromium oxide/magnesium oxide-mixed catalysts for deuterium exchange between hydrogen and water vapour" Isotopenpraxis, May 1997. V. 13. (5) p. 179-182.

F. H.Abou El-Nour et al. "Reactive of promoted nickel catalysts for deuterium exhcnage between hydrogen and water in the vapour phase" Isotopenpraxis, (Nov. 1980) V. 16(11), p. 370-372.

F. H.Abou El-Nour et al. "Binary Supported nickel catalysts for the deuterium exchange reaction between hydrogen and water vapour" Isotopenpraxis (Apr. 1982) V. 18/(4), p. 131-132.

F. H.Abou El-Nour et al. "Comparative study on the behaviour of alumina/chromia-promoted nickel catalysts in the liquid and vapour phase reactions" Isotoppenpraxis (Jul. 1985), V. 21(7), p. 244-246.

M. M. Abdel-Badei, et al. "Nickel/chromium oxid/zirconium oxide catalysts for hydrogen/deuterium isotopic exchange" Isotopenpraxis 26(1990) 7, pp. 336-338, no month.

F. Abou El-Nour et al. H/D isotopic exchange between hydrogen and water vapour on Ni/Cr2O3/ThO2 catalysts Isotopenpraxis 26(1990) 11, p. 529-531, no month.

J.H. Rolston, et al. "Isotopic exchange between hydrogen and water vapor over supported metal catalysts. Part I. Kinetics of the Exchange" Canadian Journal of Chemistry, V. 50, 1972, p. 1990-1906, no month.

Norman Henry Sagert, et al. The influence of the substrate on Hydrogen-water deuterium exchange over carbon supported platinum Canadian Journal of Chemistry, V. 50, p. 3686-3693, 190(1972), no month.

Norman Henry Sagert, et al. "Hydrogen water deuterium exhcnage over graphon supported group VIII noble metals" Canadian Journal of Chemistry, V. 51, 1973 p. 4031-4037, no month.

Norman Henry Sagert, et al. "Hydrogen water deuterium exchange over unsupported group VIII noble Metals" Canadian Journal of Chemistry, V. 52, 1974, pp. 2960-2967, no month.

Koei Kawakami et al. "Kinetic study of isotopic exchange reaction between hydrogen and water vapor over a Pt/SDBC hydrophobic catalyst sheet" Canadian Journal of Chemical Engineering, V. 66, p. 338-342, (1988), no month.

N. M. Gupta, et al. "Deuterium isotope exchange reaction between hydrogen and water over polyester-supported platinum catalysts" Journal of Catalysis V. 121, p. 386-395 (1990), no month.

Mao Shiqi et al. "A study of Isotope Exchange between Water and hydrogen using a Pt-C-PTEE Hydrophobic catalyst" Journal of Nuclear and Radiochemistry V. 12(2) p. 107 (1990), no month.

J.H. Rolston et al. "Deuterium-Protium Isotopic Fractionation between Liquid Water and Gaseous Hydrogen" J. Physical Cheistry,, V. 86 (13), p. 2494(1982), no month.

S. Suppiah, et al. "Diffusional effects in wetproofed catalysts for Isotopic exchange between hydrogen gas and water vapour" J. of Chemical Engineering. V. 65, 256-263, 1987, no month.

F.H. Abou El-Nour, et al. "X-Ray Studies onmetal oxide promoted nickel catalysts for hydrogen-water deuterium exchange" Isotopenpraxis V. 18-6, pp. 223-225, Jun. 1982.

Von K. J. Best, et al. "Die katalyse der Isotopenaustauschreaktion $HTO+H_2$=$HT+H_2O$ an der intermetallischen Verbindung NiGa" Ber. Bunsenges. Phys. Chem. 75; No. 6, p. 524-532 (Jun. 1971) (Abstract).

Mark A. Aubart, et al. "Platinum-gold cluster catalysts for D2(gas)/ H2O(liquid) Isotope Exchange" Journal of Inorganic Chemistry, 1994, V. 33, N. 18 p. 3852-3854, no month.

B.M. Andreev et al. "Activity of Hydrophobic catalyst basedon LaNi5 and polyterafluoro-ethylene in isotopic exchange reaction of hydrogen with water" Kinetics and Catalysts, V. 27/1 (1986), no month.

J. P. Butler, et al. "Hydrogen Isotope Separation by catalyzed exchange between hydrogen and liquid water" Separation Science Technology, 15(3), pp. 371-396 (1980), no month.

Y. Wei, et al. "Deactivationof a Hydrophobic Pt/SDBC Catalyst by nitrogen compounds for hydrogen Isotopic exchange reaction" Nuclear Chemistry & Chem. Engineering Center Vo. 21/6 pp. 1161-1169 (1995) (Abstract), no month.

S.eungwoo Paek, et al. "Preparation, characterization, and reactivity of Pt/SDBC catalysts for the hydrogen-water isotopic exchange reaction" J. of Radioanalytical & Nuclear Chemistry vol. 242/3 p. 709-715 (1999), no month.

G. Ionita et al. "Hydrophobic Catalysts for the Isotopic Exchange Between Hydrogen and Water" Int'l Symposium on Nuclear Energy, pp. 56-62 (No. 1993), no month.

I. Ursu et al. "Poisoning with Hydrogen of Platinum-Active Carbon Catalyst during the Isotopic Exchange Reaction Between Hydrogen" Academia R.P.R. Institutional de Fizia Atomica, Bucharest (1963), no month.

T. Sato et al. "Catalytic process for recovery of heavy water in fresh water from the sea" Int'l Symposium on Fresh Water from the Sea, Las Palmas, pp. 47-54, 1978, no month.

G. Tan et al. "The preparation of Pt/ZSM-5 Catalysts" V. 19, pp. 123-129 (1984), no month.

H.A. Rangwala et al. "Preparation, characterization and activity of wet-proofed Pt/Silicalite Catalysts" The Canadian Journal of Chemical Engineering vol. 2, p. 296-303, 1994, no month.

\* cited by examiner

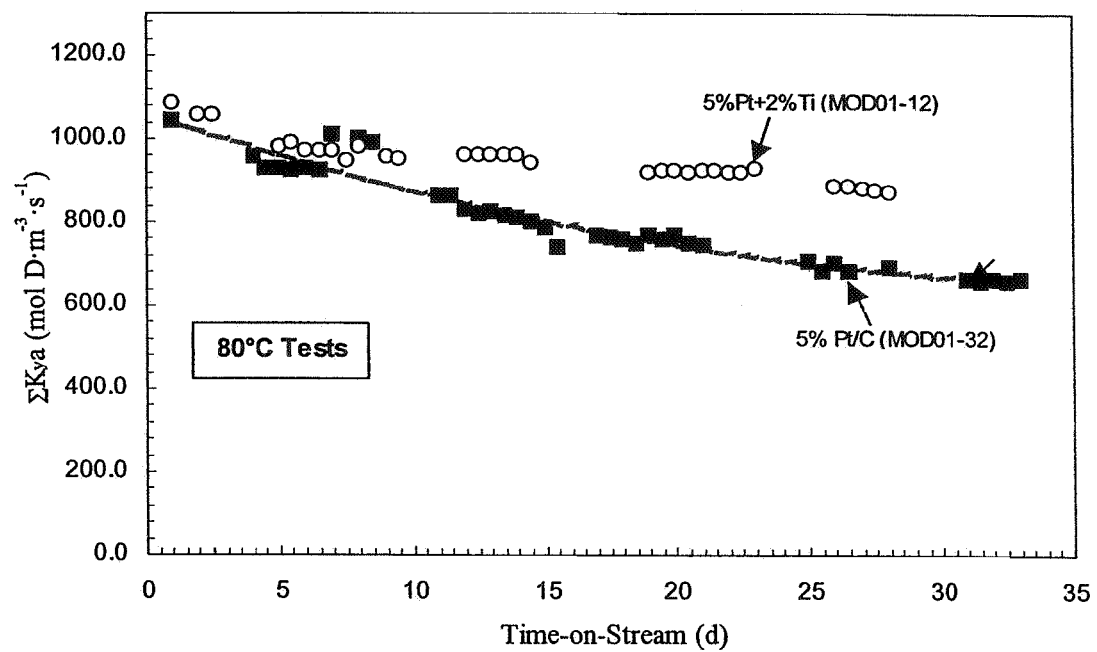

WETPROOFED CATALYSTS FOR HYDROGEN ISOTOPE EXCHANGE

This is a divisional of application Ser. No. 10/455,365, filed Jun. 6, 2003 now abandoned. The entire disclosure(s) of the prior application(s), application Ser. No. 10/455,365 is considered part of the disclosure of the accompanying divisional application and is hereby incorporated by reference.

FIELD OF THE INVENTION

The invention relates to the exchange of hydrogen isotopes between gaseous hydrogen and liquid water. More particularly, it relates to an improved catalyst to be used in a process that enhances said exchange.

BACKGROUND OF THE INVENTION

The exceptional properties of heavy water as a neutron moderator make it useful in nuclear reactors and in particular the CANDU nuclear reactor developed by Atomic Energy of Canada Limited. Most of the world's heavy water supplies are currently provided by the Girdler-Sulphide process or processes based on ammonia-hydrogen catalytic exchange. The Girdler-Sulphide process is a bithermal (two temperature) heavy water production process and takes advantage of differences in thermodynamic separation factors between water and hydrogen sulphide. The process uses a cascaded series of dual-temperature, mass transfer columns circulating large quantities of hydrogen sulphide gas countercurrently to a water feed. Both the Girdler-Sulphide process and ammonia-hydrogen catalytic exchange require large capital expenditures. The ammonia process has size limitations and the Girdler-Sulphide process consumes large amounts of energy and utilizes very hazardous hydrogen sulphide.

The high cost of heavy water produced using the Girdler-Sulphide process and ammonia-based processes can affect the economic attractiveness of heavy-water moderated reactors such as CANDU. Accordingly, a number of alternative processes have been proposed for heavy water production. Among them are processes that exploit deuterium isotope exchange between water and hydrogen using a catalyst.

One such process is known as Combined Electrolysis and Catalytic Exchange ("CECE"). The CECE process has previously been described in U.S. Pat. No. 3,974,048. The CECE heavy water production process is a monothermal process that extracts heavy water from normal water by a combination of electrolysis and catalytic exchange between the water feeding electrolytic cells and the hydrogen produced in them. The primary components of a normal multistage CECE process are each stage's hydrogen water catalytic exchange enrichment columns, oxygen-stream vapour scrubber columns and electrolytic cells. The catalytic exchange columns enrich water flowing down the column by stripping deuterium from the up-flowing hydrogen gas, with conditions always favouring deuterium transfer to the liquid. Electrolytic cells provide a bottom reflux flow by converting the enriched liquid leaving the catalytic exchange column into hydrogen gas. The electrolytic cells in a CECE process not only provide a bottom reflux flow but also enrich the cell liquid inventory. Because the entire feed stream must be electrolysed, the cost of electrolysis can result in a prohibitively expensive process for heavy water extraction and is practical only as a parasitic process where large scale electrolysis is performed for other reasons.

A second process, Combined Industrially Reforming and Catalytic Exchange ("CIRCE"), is a parasitic monothermal process. CIRCE uses an industrial monothermal steam reformer for the first stage to generate hydrogen from methane and water feeds and electrolysis (typically CECE) for higher stages. Although it is more complex than the CECE process, the main attraction of the CIRCE process is the widespread availability of relatively large plants producing hydrogen by steam reforming. The CIRCE process suffers from the fact that elevated levels of deuterium in the reformer mean that leaks of any deuterated species (water, methane, hydrogen) from the reformer are particularly costly and the plant requires a high level of leak tightness in the reformer. Optimization of the CIRCE process for the lowest unit cost is primarily a balance between minimizing first stage catalyst volume and loss of deuterium with reformer leakage (by moving separative work into the higher stages) and minimizing electrolytic cell capital costs (by moving separative work into the first stage).

An alternative process to harness water-hydrogen exchange is the Bithermal Hydrogen Water ("BHW") process. BHW is a non-parasitic process using liquid phase catalytic exchange ("LPCE") to generate heavy water. In each stage there is an upper cold tower where the deuterium transfers from the hydrogen to the liquid water, and a lower hot tower where the deuterium transfers from the water to the hydrogen gas. The feed to the higher stages is taken from between the cold and hot towers. The BHW process is similar to the Girdler-Sulphide process, but with the advantages of much superior separation factors, lower energy consumption and non-toxic and non-corrosive process fluids. BHW liquid phase catalytic exchange stages can advantageously be substituted for most or all of the CECE upper stages of the CIRCE process. Such a hybrid system can result in a process that is more cost effective than a conventional CIRCE process.

The CECE, CIRCE and BHW processes rely upon wetproofed catalysts to catalyze the exchange reaction between the hydrogen gas and the liquid water. The preferred catalyst is a Group VIII metal (most preferably platinum) having a liquid-water repellent organic polymer or resin coating thereon selected from the group consisting if polyfluorocarbons (preferably polytetrafluoroethylene), hydrophobic hydrocarbon polymers of medium to high molecular weight, and Silicones, and which are permeable to water vapour and hydrogen gas. Catalysts of this nature are described in U.S. Pat. Nos. 3,981,976, 4,126,667 and 4,471,014. LPCE implements highly active structured catalytic modules, which incorporate hydrophobic catalytic layers and hydrophilic mass-transfer layers. Isotope exchange occurs on the hydrophobic catalytic layers while mass transfer occurs between water vapour and liquid water within the catalyst module.

Platinum is widely accepted as the most active catalyst at high and low temperatures and other comparable conditions for hydrogen isotope exchange compared to other metals used as catalysts. The cost of catalysts used in LPCE processes represents a significant fraction of the entire heavy water production cost. Platinum presents a significant contribution to the overall cost of the structured catalyst. With the price of platinum steadily increasing, a clear cost advantage can be achieved by reducing the dependency on platinum for hydrogen isotope exchange catalysis.

Highly active, low-cost catalysts for hydrogen isotope exchange between hydrogen and water have been a long-term objective internationally since the 1950s. Researchers have explored either non-Pt based catalysts or catalysts containing Pt at a significantly reduced loading in combination with other metals.

Thus, there remains a need for a highly active and highly stable catalyst that is less costly than conventional mono-platinum catalysts for heavy water production and other isotope exchange processes between water and hydrogen.

SUMMARY OF THE INVENTION

It has now been found that a highly active and highly stable catalyst that is less costly than conventional mono-platinum catalysts for heavy water production and other isotope exchange processes between water and hydrogen can be achieved by a wetproofed bimetallic catalyst containing Pt and one or either of Cr or Ti in various relative amounts. In a preferred embodiment, the Pt, Cr and Ti are deposited on particles of suitable support materials, such as carbon black, Silicalite™ and silica. The bimetallic catalysts, Pt—Cr and Pt—Ti, may be prepared by co-precipitation or co-impregnation of the different metals. The Pt, Cr and Ti compounds used to produce the catalysts can be $H_2PtCl_6$, $Cr(NO_3)_3$ and $TiCl_4$, respectively.

The catalysts are intended to be used in the CECE, CIRCE and BHW heavy water production processes to catalyze the exchange reaction between hydrogen gas and liquid water over a wide range of temperatures and pressures. The catalysts can also be used for detritiation processes. The catalysts in accordance with the present invention present an opportunity to reduce the cost of the isotope exchange catalyst and improve the economics of the processes. This can be achieved by lowering the costs of the catalyst while maintaining activity, by increasing the catalyst activity so that less catalyst is required, or both.

Thus in accordance with the present invention, there is provided a wetproofed catalyst for use in hydrogen isotope exchange between water and hydrogen comprising a hydrophobic porous matrix having dispersed therein catalytically active platinum and at least one other metal selected from the group consisting of chromium and titanium. Preferably, the platinum and the at least one other metal are deposited on support particles dispersed in the hydrophobic matrix. Preferably, the hydrophobic matrix is polytetrafluoroethylene or silicone and the support particles are carbon black.

BRIEF DESCRIPTION OF THE DRAWINGS

In drawings which illustrate embodiments of the invention:

FIG. 1 is a graphical representation of long-term stability test data showing activities for catalysts with and without the secondary metal at 80° C.

DETAILED DESCRIPTION OF THE PREFERRED EMBODIMENTS

Studies were carried out to investigate whether the Pt content of conventional wetproofed isotope exchange catalyst could be reduced or eliminated by promoting the catalytic properties of Pt with other additive metals or replacing the Pt with other less costly metals. A number of Pt-based bimetallic formulations were tested. The percentage loading of each metal was varied in the test samples to investigate the effects of the actual amount and the ratio of the different metals on the substrate. The catalyst samples were subjected to different tests to determine the activities of the catalysts. The conditions of testing ranged in temperature and pressure under vapour-phase or trickle-bed mode.

Catalyst Powder Preparation by Precipitation

Unless otherwise stated, carbon black was used as the substrate for all catalysts. Teflon® 30 suspension from E.I. du Pont de Nemours was used for wetproofing the catalyst.

With a number of exceptions, all catalyst powders comprising Pt were prepared using a standard method of precipitation of Pt using sodium platinum sulfite as generally described in U.S. Pat. No. 4,082,699 Petrow et al. (the contents of which are incorporated herein by reference). Platinum oxide was precipitated onto the powder support by reacting $Na_6Pt(SO_3)_4$ prepared from chloroplatinic acid as described in U.S. Pat. No. 4,082,699, with hydrogen peroxide and then the platinum oxide was reduced to platinum metal. Most of the bimetallic catalyst powders were prepared using variations of the standard precipitation procedure. The standard precipitation procedure was used to make catalyst powders with Pt as the sole metal component.

The bimetallic precipitation procedure is similar to the standard precipitation procedure with the only difference being the addition and dissolution of an additional metal salt(s) to the platinum solution and the use of extra hydrogen peroxide. Pt—Cr catalysts were prepared in the same manner as the standard method for Pt with co-precipitation of sodium platinum sulfite ($Na_6Pt(SO_3)_4$) and chromium (III) nitrate ($Cr(NO_3)_3$. For Pt—Ti catalysts, $TiCl_4$ was substituted for $Cr(NO_3)_3$.

Coating Catalyst onto Screen for Testing

The catalysts for testing were prepared by loading onto a carrier such as a stainless screen with Teflon® 30 suspension from E.I. du Pont de Nemours in the manner as described in U.S. Pat. No. 4,143,123, the contents of which are incorporated herein by reference. All of the catalyst powders were sprayed with Teflon® in a 1:1 ratio onto stainless steel screens. For vapour-phase testing, catalyst powders were sprayed onto a single 100-mm wide by 320-mm long piece of screen. All of the catalysts for trickle bed $K_ya$ tests were sprayed onto 250-mm wide by 900-mm long pieces.

EXAMPLE 1

Process for Making a 5% Pt+2% Ti on Carbon XC-72R Catalyst

A small batch of the bimetallic catalyst was prepared from 25 g of XC-72R carbon. About 4.6 g of $Na_6Pt(SO_3)_4$ and 2.1 g of $TiCl_4$ using the procedure outlined in U.S. Pat. No. 4,082,699. This catalyst powder was then mixed with Teflon®D 30 in a 1:1 ratio and coated onto a 28 mesh stainless steel screen with 0.0075-inch wire diameter in the manner described in U.S. Pat. No. 4,143,123.

EXAMPLE 2

Process for Making a 5% Pt+2% Cr on Carbon XC-72R Catalyst

A small batch of catalyst powder was prepared from 25 g of XC-72R carbon, about 4.7 g of $Na_6Pt(SO_3)_4$, and about 10.7 g of chromium nitrate nanohydrate, $Cr(NO_3)_3.9H_2O$, using the procedure outlined in U.S. Pat. No. 4,082,699. This catalyst powder was mixed with Teflon® 30 in a 1:1 ratio and coated onto a 28 mesh stainless steel screen with 0.0075-inch wire diameter in the manner described in U.S. Pat. No. 4,143,123.

A number of the catalyst test samples [5% Pt+2% Au, 7% Pt+3% Pd and 5% Ni+5% Pt on XC-72R] used for comparison purposes were prepared by conventional co-impregnation methods rather than co-precipitation.

Most of the Ni catalysts with or without Cr were prepared using $NiCl_2$ or $Ni(NO_3)_2$ and $Cr(NO_3)_3$ by precipitating with sodium carbonate on different supports such as carbon or Silicalite. Exceptions were 5% Ni on carbon (by impregnation), 15% Ni+0.1% Pd on XC-72R (by chemical deposition), 8% Ni+2% Cr+0.1% Pd on XC-72R (by sequential precipitation in the order: co-precipitation of Ni+Cr then precipitation of Pd).

A number of different test facilities were used to determine the activities of the catalysts prepared in this work. The conditions of testing ranged in temperature and pressure under vapour-phase ($H_2/H_2O$ vapour) or trickle-bed mode ($H_2/H_2O$ vapour/$H_2O$ liquid).

High Pressure/High Temperature Vapour-Phase Reactor System [Caldwell Reactor]

This is a vapour phase reactor system with internal gas circulation to reduce external mass transfer resistance. Catalysts were tested at a constant pressure of 2000 kPa (abs) and at temperatures ranging from 68 to 155° C. The relative humidity was raised to a maximum value of 84% while the vapour content was increased to a maximum of 9.0%. The actual weight of the catalyst screen was maintained at about 0.65 g.

Table 1 reports the catalytic activities for Pt catalysts promoted by either Cr or Ti. In Table 1 (and Table 2 below) the results for a base catalyst comprising 10% Pt on Vulcan XC-72™ carbon black are presented for comparison purposes. The catalytic rate constants in Table 1 are given in the units of mol $D \cdot s^{-1} \cdot m^{-3}$, where the volume corresponds to the catalyst module structural volume. Hence, comparison of the performance of the different catalysts can be carried out in a straightforward way by comparing these activities and the metal loadings. For example, if a catalyst made with 5% Pt and a certain loading of another metal shows similar activity to the base catalyst, then 50% savings in the Pt cost is achieved with the new catalyst, assuming that the cost of the other metal is negligible (which is generally the case).

TABLE 1

Vapour Phase Catalytic Activity (mol (D) $\cdot m^{-3} \cdot s^{-1}$) of Cataysts at 2000 kPa(abs) from Caldwell Reactor

| Reactor Temperature° C. | 68 | | | | 105 | | | | 155 |
|---|---|---|---|---|---|---|---|---|---|
| Condenser Outlet Temperature° C. | 62 | 71 | 81 | 91 | 100 | 71 | 81 | 91 | 117 |
| Humidity (%) | 1.1 | 1.6 | 2.5 | 3.5 | 5.1 | 1.6 | 2.5 | 3.5 | 9.0 |
| Relative Humidity (%) | 76.5 | 26.9 | 40.8 | 58.2 | 83.8 | 5.9 | 9.0 | 12.8 | 33.0 |
| 10% Pt on XC-72R, 0.53% Pt on Screen (Base Catalyst) | 436 | 665 | 665 | 970 | 970 | 623 | 914 | 1524 | 4156 |
| 8% Pt + 2% Cr on XC-72R, 0.352% Pt on Screen | — | 1085 | — | — | 1669 | — | — | — | 4356 |
| 5% Pt + 5% Cr on XC-72R, 0.23% Pt on Screen | — | — | — | — | 1237 | 718 | — | — | — |
| 7% Pt + 3% Cr on XC-72R, 0.318% Pt on Screen | — | 727 | — | — | — | 711 | — | — | — |
| 8% Pt + 2% Ti on XC-72R, 0.392% Pt on Screen | 472 | 674 | — | — | 2277 | 1063 | — | — | 4554 |
| 5% Pt + 2% Ti on XC-72R, 0.246% Pt on Screen | — | 720 | — | — | 1732 | 578 | — | — | — |
| 5% Pt + 1% Ti on XC-72R, 0.255% Pt on Screen | — | 746 | — | — | 1732 | 672 | — | — | — |
| 5% Pt + 5% Ti on XC-72R, 0.238% Pt on Screen | — | — | — | — | 1992 | — | — | — | — |

TABLE 1-continued

Vapour Phase Catalytic Activity (mol (D) · m$^{-3}$ · s$^{-1}$) of Catalysts at 2000 kPa(abs) from Caldwell Reactor

| | Reactor Temperature° C. | | | | | | | |
|---|---|---|---|---|---|---|---|---|
| | 68 | | | | 105 | | | 155 |
| | Condenser Outlet Temperature° C. | | | | | | | |
| | 62 | 71 | 81 | 91 | 100 | 71 | 81 | 91 | 117 |
| | Humidity (%) | | | | | | | |
| | 1.1 | 1.6 | 2.5 | 3.5 | 5.1 | 1.6 | 2.5 | 3.5 | 9.0 |
| | Relative Humidity (%) | | | | | | | |
| | 76.5 | 26.9 | 40.8 | 58.2 | 83.8 | 5.9 | 9.0 | 12.8 | 33.0 |
| 2% Pt + 5% Ti on XC-72R 0.104% Pt on Screen | 192 | 568 | — | — | 1206 | — | — | — | 3172 |

As seen from Table 1, compared with the base 10% Pt on XC-72R catalyst, the bimetallic catalysts (Pt in combination with Ti or Cr on XC-72R) had similar or higher activities at most conditions. Since, all the bimetallic catalysts in Table 1 had lower than 10% Pt, their Pt content in a unit volume of bed will be correspondingly lower. For example, the 2% Pt+5% Ti catalyst has only approximately 0.24 kg·m$^{-3}$ of Pt compared to the 10% Pt catalyst with say 1.2 kg·m$^{-3}$ of Pt—a considerable saving in the cost of Pt. For a given loading of Pt, generally, the Pt—Ti catalysts appear to be more active than Pt—Cr catalysts as seen with 8% Pt+2% Ti versus 8% Pt+2% Cr and 5% Pt+5% Ti versus 5% Pt+5% Cr.

Apart from the cost-savings, the improved wetproofed catalysts experienced a significant increase to their activities as compared with the base 10% Pt catalyst at high temperatures. For example, the catalyst with 8% Pt+2% Ti on XC-72R is as active as the base catalyst at 68° C. and 62° C. for reactor and condenser outlet temperatures, respectively. However, at 105° C. and 100° C. for reactor and condenser outlet temperatures, respectively, the Pt—Ti catalyst had an activity significantly greater than that of the base catalyst. The catalyst containing 2% Pt-5% Ti on XC-72 also had a similar effect.

Though the results at 105° C. reactor temperature show that the bimetallic catalysts may be somewhat more strongly dependent on relative humidity or vapour content compared to the base catalyst, the results at 155° C. reactor temperature do not confirm this observation. During the testing of these catalysts, it was noticed that the bimetallic catalysts took considerably longer period to steady out, during which time the activity of the catalyst continued to increase. The base catalyst, on the other hand, showed an increase first followed by a somewhat steady activity and then a slow decrease. In these tests it was also noticed that the bimetallic catalysts appeared to show a prolonged activity increase with time-on-stream at higher relative humidities. This was assumed to be indicative of a strong dependence of activity on the relative humidity. Such dependence is considered to be advantageous in the trickle-bed environment of isotope exchange application.

Table 2 contains the results for catalytic activities of Pt catalysts promoted by Zr or V for purposes of comparison.

TABLE 2

Vapour Phase Catalytic Activity (mol (D) · m$^{-3}$ · s$^{-1}$) of Catalysts at 2000 kPa(abs) from Caldwell Reactor

| | | Reactor Temperature° C. | | | | | | | |
|---|---|---|---|---|---|---|---|---|---|
| | | 68 | | | | 105 | | | 155 |
| | | Condenser Outlet Temperature° C. | | | | | | | |
| | | 62 | 71 | 81 | 91 | 100 | 71 | 81 | 91 | 117 |
| | | Humidity (%) | | | | | | | |
| | | 1.1 | 1.6 | 2.5 | 3.5 | 5.1 | 1.6 | 2.5 | 3.5 | 9.0 |
| Entry | | Relative Humidity (%) | | | | | | | |
| No. | | 76.5 | 26.9 | 40.8 | 58.2 | 83.8 | 5.9 | 9.0 | 12.8 | 33.0 |
| 1 | 10% Pt on XC-72R, 0.53% Pt on Screen (Base Catalyst) | 436 | 665 | 665 | 970 | 970 | 623 | 914 | 1524 | 4156 |
| 2 | 8% Pt + 2% Zr on XC-72R, 0.385% Pt-screen, KK00-58 (KK00-54) | | 451 | | | 983 | | | | |

TABLE 2-continued

Vapour Phase Catalytic Activity (mol (D) · m$^{-3}$ · s$^{-1}$)
of Catalysts at 2000 kPa(abs) from Caldwell Reactor

| | | Reactor Temperature° C. | | | | | | | |
|---|---|---|---|---|---|---|---|---|---|
| | | 68 | | | | 105 | | | 155 |
| | | Condenser Outlet Temperature° C. | | | | | | | |
| | | 62 | 71 | 81 | 91 | 100 | 71 | 81 | 91 | 117 |
| | | Humidity (%) | | | | | | | |
| | | 1.1 | 1.6 | 2.5 | 3.5 | 5.1 | 1.6 | 2.5 | 3.5 | 9.0 |
| Entry | | Relative Humidity (%) | | | | | | | |
| No. | | 76.5 | 26.9 | 40.8 | 58.2 | 83.8 | 5.9 | 9.0 | 12.8 | 33.0 |
| 3 | 5% Pt + 2% V on XC-72R, 0.22% Pt-screen, KK01-3 (KK00-73) | | 200 | | | | | | | |

As can be seen from Table 2, neither Zr nor V showed any obvious promoting effects at the conditions of the tests in the reactor. A significant reduction in activity occurred when these metals were present with Pt in the catalyst compared to the base catalyst. A comparison of the results for catalysts in Table 2 with those in Table 1 containing similar loadings of Pt shows that Zr and V were inferior to Cr or Ti as catalyst promoters.

The test results for various compositions are reported in Table 3.

TABLE 3

Activities of Ni containing Catalysts

Vapour Phase Catalytic Activity (mol (D) · m$^{-3}$ · s$^{-1}$)
of Catalysts at 2000 kPa(abs) from Caldwell Reactor

| | | Reactor Temperature | | | | | | | | |
|---|---|---|---|---|---|---|---|---|---|---|
| | | 68 | | | | 105 | | | 155 | 200 |
| | | Condenser Outlet Temperature° C. | | | | | | | | |
| | | 62 | 71 | 81 | 91 | 100 | 71 | 81 | 91 | 117 | 71 |
| | | Humidity (%) | | | | | | | | |
| | | 1.1 | 1.6 | 2.5 | 3.5 | 5.1 | 1.6 | 2.5 | 3.5 | 9.0 | |
| Entry | | Relative Humidity (%) | | | | | | | | |
| No. | | 76.5 | 26.9 | 40.8 | 58.2 | 83.8 | 5.9 | 9.0 | 12.8 | 33.0 | |
| 1 | 10% Pt on XC-72R, 0.53% Pt on Screen (Base Catalyst) | 436 | 665 | 665 | 970 | 970 | 623 | 914 | 1524 | 4156 | |
| 2 | 5.1% Ni - Silicalite, (NP04) | | 18 | | | | | | | | 18 |
| 3 | 3.5% Ni + 1.5% Cr on XC-72, (NP11) | | | | | | | | | | 13 |
| 4 | 5% Ni-XC-72, (NP16) | | | | | | | | | | 19 |
| 5 | 8.6% Ni + 1.4% Cr-XC-72R, 0.44% Ni, cured in air, post reduction, KK00-41 C&D (KK00-36) | | | | | | | | | | 9 |
| 6 | 8.6% Ni + 1.4% Cr-XC-72R, 0.44% Ni, cured in He, post reduction, KK00-41 A&B (KK00-36) | | | | | | | | | | 15.5 |
| 7 | 8% Ni + 2% Cr + 0.5% Pd-XC-72R, 0.455% metal-screen, KK00-33 (KK00-29) | | | | | | 13 | | | | 81 |
| 8 | 5% Ni + 5% Pt-XC-72R 0.233% Pt, (NP19), FM00-08 | | 27 | | | | | | | | — |

TABLE 3-continued

Activities of Ni containing Catalysts

Vapour Phase Catalytic Activity (mol (D) · m$^{-3}$ · s$^{-1}$)
of Catalysts at 2000 kPa(abs) from Caldwell Reactor

| | | Reactor Temperature | | | | | | | | |
|---|---|---|---|---|---|---|---|---|---|---|
| | | 68 | | | 105 | | | 155 | | 200 |
| | | | | | Condenser Outlet Temperature° C. | | | | | |
| | | 62 | 71 | 81 | 91 | 100 | 71 | 81 | 91 | 117 | 71 |
| | | | | | Humidity (%) | | | | | |
| | | 1.1 | 1.6 | 2.5 | 3.5 | 5.1 | 1.6 | 2.5 | 3.5 | 9.0 | |
| Entry | | | | | Relative Humidity (%) | | | | | |
| No. | | 76.5 | 26.9 | 40.8 | 58.2 | 83.8 | 5.9 | 9.0 | 12.8 | 33.0 | |
| 9 | 15% Ni + 0.1% Pd-XC-72R, 0.707% Ni, KK00-71 (KK00-64) | | | | | | | | | | 12 |
| 10 | 10% Ni + 3% Sn-XC-72R, 0.665% metal, KK00-70A (KK00-62) | | | | | | | | | | 14 |

As can be seen from the results in Table 3, none of the Ni containing catalysts showed any significant activity in the high pressure/high temperature vapour-phase reactor tests. Even the tests at a relatively high temperature of 200° C. did not activate the Ni to yield a desirable activity.

Ambient Pressure/High Temperature Trickle-Bed Reactor System

This is a nominally 50-mm diameter trickle-bed reactor test facility operated at ambient pressure and temperatures up to 80° C. Typical long term test results are shown in FIG. 1 for 5% Pt and 5% Pt+2% Ti catalysts at 80° C. and 118 kPa (abs). The tests were done at a water flux of 100 mol·m$^{-2}$·s$^{-1}$ and hydrogen flux of 50 mol·m$^{-2}$·s$^{-1}$. A few sets of $\Sigma K_y a$ values are given in Table 4 for discussion in conjunction with the results presented in FIG. 1.

TABLE 4

Effect of temperature on trickle-bed catalyst activity.

$\Sigma K_y a^*$ [mol(D) · m − 3 · s − 1]

| T (° C.) | Base Pt catalyst 10% Pt | Base Pt catalyst 5% Pt | Cr-promoted 5% Pt + 5% Cr | | Ti-promoted catalyst 5% Pt + 2% Ti | |
|---|---|---|---|---|---|---|
| 25 | 466@ | 339 | 144@ | | 297@ | |
| 60 | 1164@ | 1008 | 844 | 828 | 499@ | 410@ | 935@ | 854 |
| 80 | | 1191 | | 1041 | | 597 | | 1084 |

@Water and H$_2$ fluxes are all 100 mol · m$^{-2}$ · s$^{-1}$. Otherwise, Water and H$_2$ fluxes are 100 and 50 mol · m$^{-2}$ · s$^{-1}$, respectively.
*Catalyst activities at different temperatures are grouped in columns only for temperature conditions accompanying immediate changes.

As can be seen from Table 4, on increasing the test temperature from 25 to 80° C., the activity increased more steeply for the bimetallic Pt—Cr and Pt—Ti catalysts compared to the base Pt catalyst.

Though more data is required for a complete understanding of the temperature effect on activity for these catalysts, it may be generalized from the results shown in Table 4 that the bimetallic catalysts show a somewhat stronger dependence on temperature compared to the base Pt catalyst.

The test results shown in FIG. 1 provide some indications that there may be some differences in the deactivation profiles of Ti catalysts compared with the base Pt catalyst over the test period. While the base catalyst continued to deactivate gradually over the one month period, the bimetallic catalyst steadied out within this period. At the end of the tests, the bimetallic catalyst had an activity of about 830 mol·m$^{-3}$·s$^{-1}$ while the base catalyst had a lower activity of 630 mol·m$^{-3}$·s$^{-1}$, revealing superior performance achieved by adding the secondary metal.

High Pressure Trickle-Bed Test Facility (HPMT)

Nominally 100-mm diameter by 250-mm long catalyst modules were tested at temperatures up to 150° C. and pressures up to 2500 kPa(g) in this facility.

The results obtained on the 8% Pt+2% Cr and 5% Pt+5% Cr catalysts were compared with the base catalyst. Each catalyst module tested was 100-mm diameter by 250-mm long, consisting of a catalyst layer thickness approximately equivalent to the base catalyst loading of 1.2 g·L$^{-1}$. This, for example, would translate into a Pt loading of 0.6 g·L$^{-1}$ for the 5% Pt+5% Cr catalyst.

The tests results showed that the Pt—Cr catalysts performed well. In general, at temperatures in the range of about 50 to 150° C., the activity of the catalysts matched the performance of the base catalyst. This is surprising since the bimetallic catalysts contained less Pt in the module than the base catalyst. This is especially surprising of the 5% Pt+5% Cr catalyst which contained only half the Pt loading normally present in the base catalyst. The 8% Pt+2% Cr containing bimetallic catalyst had about 1.0 g·L$^{-1}$ of Pt.

The 8% Pt+2% Cr and 5% Pt+5% Cr catalysts also did not show any appreciable deactivation over a 30 day period of testing and in fact showed some modest increase in activity over the test period. Moreover, these bimetallic catalysts appeared to show more stable activity than the base catalyst.

As is evident from the above test results, given the cost reduction realized through the substitution of platinum with an inexpensive alternative, the bimetallic catalysts, Pt—Cr and Pt—Ti, are an improvement over the base 10% Pt catalyst at temperatures greater than 60° C. and at ambient and higher pressures. The amount of platinum can be varied depending on the activity/cost/stability considerations. Catalysts having less than 10% Pt by weight based on the total weight of the support and the deposited metals will show cost improvements over base 10% Pt catalyst. Catalysts can also be prepared in accordance with the present invention having a base 10% Pt loading with a Cr or Ti promoter to improve performance or stability as compared to the monometallic catalyst. Catalysts in accordance with the present invention can advantageously have platinum in an amount of from about 2% to about 8% and the amount of Cr or Ti from about 1% to 5% by weight based on the total weight of the support and the deposited metals and can advantageously have a weight ratio of platinum to Cr or Ti in the range of 5:1 to 2:5. The combined amount of platinum and Cr or Ti can advantageously be about 10% by weight based on the total weight of the support and deposited metals.

Although the above tests used carbon black as the catalyst support, the invention is not so limited and suitable supports other than carbon black may be used. While the catalysts in accordance with the present invention are particularly suitable for use in heavy water production, they can also be used in other hydrogen isotope exchange processes including heavy water upgrading and detritiation applications. Thus, the catalysts in accordance with the present invention can be used for the separation of tritium from hydrogen or deuterium. Other modifications can also be made without departing from the scope of the invention.

We claim:

1. A method to catalyse hydrogen isotope exchange between water and hydrogen which comprises contacting said water and hydrogen with a wetproofed catalyst, said catalyst comprising a non-nickel containing hydrophobic porous matrix having dispersed therein catalytically active platinum and at least one other metal selected from the group consisting of chromium and titanium.

2. The method according to claim 1 wherein the platinum and the at least one other metal are deposited on support particles dispersed in said hydrophobic matrix.

3. The method according to claim 2 wherein the hydrophobic matrix is polytetrafluoroethylene and said support particles are carbon black.

4. The method according to claim 3 wherein the platinum and the at least one other metal are deposited on said carbon black support particles by co-precipitation.

5. The method according to claim 3 wherein the amount of platinum is less than 10% by weight based on the total weight of the support and the deposited metals.

6. The method according to claim 3 wherein the amount of platinum is from about 2% to about 8% and the amount of the at least one other metal is from about 1% to 5% by weight based on the total weight of the support and the deposited metals.

7. The method according to claim 3 wherein the weight ratio of platinum to the at least one other metal is in the range of 5:1 to 2:5.

8. The method according to claim 3 wherein the combined amount of platinum and the at least one other metal is about 10% by weight based on the total weight of the support and deposited metals.

9. The method according to claim 3 wherein the at least one other metal is chromium.

10. The method according to claim 9 wherein the chromium is deposited on said support by co-precipitation from chromium (III) nitrate.

11. The method according to claim 10 wherein the catalyst comprises about 8% by weight platinum and about 2% by weight chromium based on the total weight of the support and deposited metals.

12. The method according to claim 10 wherein the catalyst comprises about 5% by weight platinum and about 5% by weight chromium based on the total weight of the support and deposited metals.

13. The method according to claim 10 wherein the catalyst comprises about 7% by weight platinum and about 3% by weight chromium based on the total weight of the support and deposited metals.

14. The method according to claim 3 wherein the at least one other metal is titanium.

15. The method according to claim 3 wherein the titanium is deposited on said support by co-precipitation from titanium (IV) chloride.

16. The method according to claim 14 wherein the catalyst comprises about 8% by weight platinum and about 2% by weight titanium based on the total weight of the support and deposited metals.

17. The method according to claim 14 wherein the catalyst comprises about 5% by weight platinum and about 1% by weight titanium based on the total weight of the support and deposited metals.

18. The method according to claim 14 wherein the catalyst comprises about 5% by weight platinum and about 2% by weight titanium based on the total weight of the support and deposited metals.

19. The method according to claim 14 wherein the catalyst comprises about 5% by weight platinum and about 5% by weight titanium based on the total weight of the support and deposited metals.

20. The method according to claim 14 wherein the catalyst comprises about 2% by weight platinum and about 5% by weight titanium based on the total weight of the support and deposited metals.

21. The method according to claim 1 where deuterium isotope exchange is catalysed between water and hydrogen for heavy water production.

22. The method according to claim 21 wherein the heavy water production is a combined electrolysis and catalytic exchange process.

23. The method according to claim 21 wherein the heavy water production is a combined industrially reforming and catalytic exchange process.

24. The method according to claim 21 wherein the heavy water production is a bithermal hydrogen water process.

25. The method of according to claim 1 wherein tritium isotope exchange is catalysed between water and hydrogen in a detritiation process.

* * * * *